United States Patent
Mansour et al.

(10) Patent No.: US 6,920,749 B2
(45) Date of Patent: Jul. 26, 2005

(54) MULTI-FUNCTION SIMPLEX/PREFILMER NOZZLE

(75) Inventors: Adel B. Mansour, Mentor, OH (US); Peter V. Buca, Parma Heights, OH (US); Rex J. Harvey, Mentor, OH (US); Kim L Aiken, Yorkville, IL (US); James F. Duncan, Akron, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/387,001

(22) Filed: Mar. 11, 2003

(65) Prior Publication Data

US 2004/0098989 A1 May 27, 2004

Related U.S. Application Data

(60) Provisional application No. 60/365,079, filed on Mar. 15, 2002, and provisional application No. 60/434,170, filed on Dec. 17, 2002.

(51) Int. Cl.[7] ............................... F02C 3/30; F02C 7/00
(52) U.S. Cl. ..................... 60/39.53; 60/801; 239/424.5; 239/555; 239/596
(58) Field of Search ................................. 60/39.53, 740, 60/801; 239/424, 424.5, 496, 500, 522, 555, 596

(56) References Cited

U.S. PATENT DOCUMENTS

| | | | |
|---|---|---|---|
| 2,959,003 A | 11/1960 | Carlisle et al. | |
| 3,310,240 A | 3/1967 | Grundman | |
| 3,464,630 A | * 9/1969 | Bendixen | 239/596 |
| 3,477,647 A | * 11/1969 | Grundman et al. | 239/596 |
| 3,881,701 A | 5/1975 | Schoenman et al. | |
| 4,616,784 A | 10/1986 | Simmons et al. | |
| 4,828,184 A | 5/1989 | Gardner et al. | |
| 5,435,884 A | 7/1995 | Simmons et al. | |
| 6,016,969 A | 1/2000 | Tilton et al. | |
| 6,068,470 A | 5/2000 | Zarzalis et al. | |
| 6,189,214 B1 | 2/2001 | Skeath et al. | |
| 6,321,541 B1 | 11/2001 | Wrubel et al. | |
| 6,499,674 B2 | * 12/2002 | Ren et al. | 239/533.12 |
| 6,553,768 B1 | 4/2003 | Trewin et al. | |

* cited by examiner

*Primary Examiner*—Louis J. Casaregola
(74) *Attorney, Agent, or Firm*—Christopher H. Hunter

(57) ABSTRACT

A multi-function spray nozzle for engine applications useful as a cooling device to introduce a fluid into the fluid stream of the engine, and as a cleaning device to introduce a fluid to clean internal components of the engine. The nozzle includes a multi-layered arrangement of etched plates defining flow paths for the first and second fluids. Non-radial feed slots direct the first fluid into a cylindrical swirl chamber. The swirling fluid exits the swirl chamber through a spray orifice or a prefilmer, depending on whether the nozzle is configured as a simplex or prefilmer nozzle. Other non-radial feed slots direct the second fluid inward, downstream of the first fluid, to create a fine dispersion of droplets for fluid stream cooling purposes. During cleaning, only the first fluid is introduced through the nozzle, which results in a larger droplet size suitable for cleaning purposes of the internal components of the engine.

9 Claims, 13 Drawing Sheets

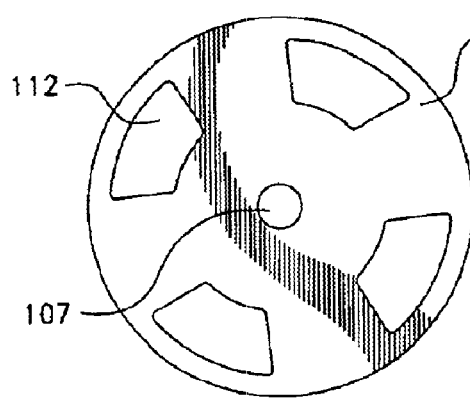 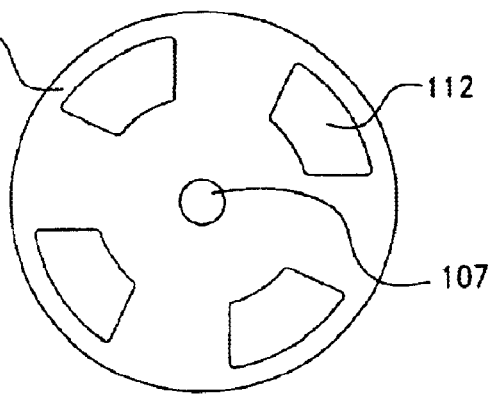
Fig. 11a  Fig. 11b
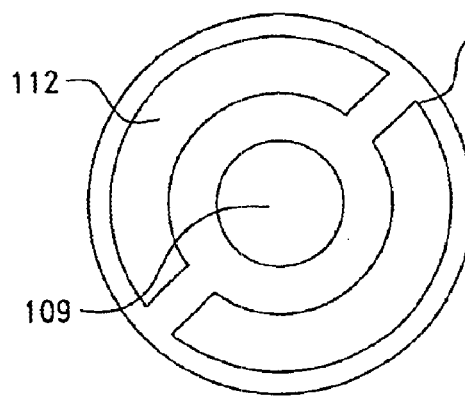 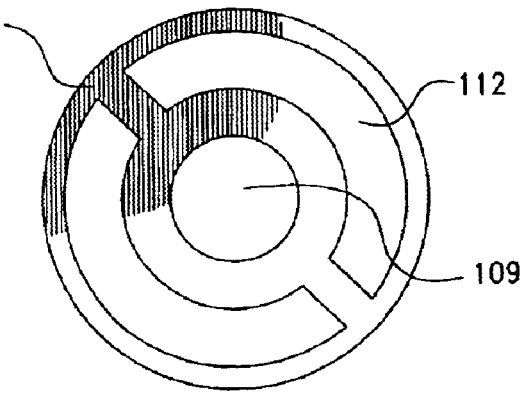
Fig. 12a  Fig. 12b
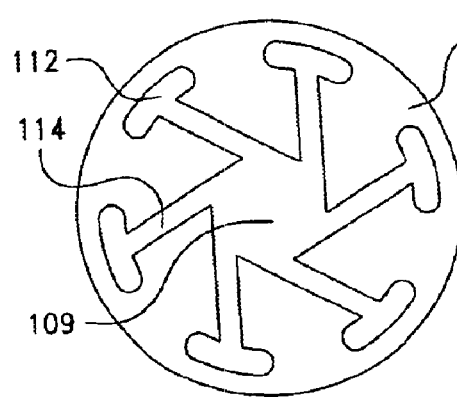 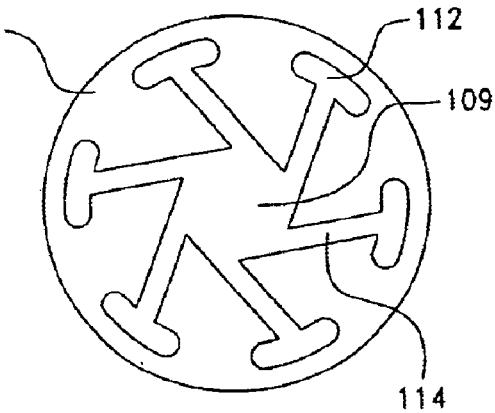
Fig. 13a  Fig. 13b

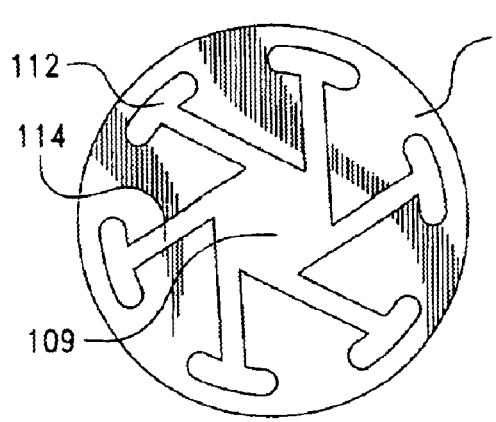 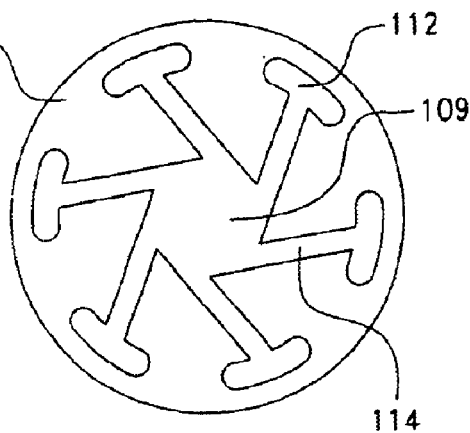
Fig. 14a	Fig. 14b
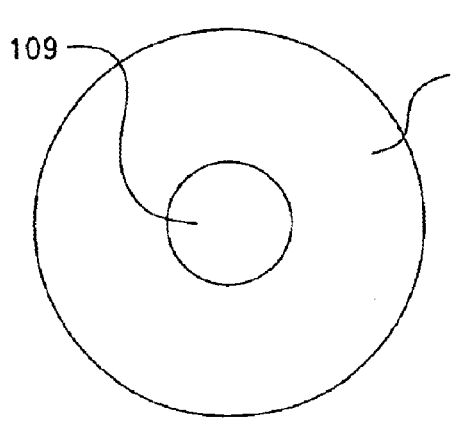 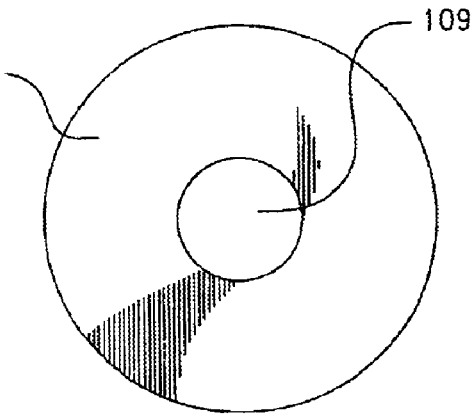
Fig. 15a	Fig. 15b
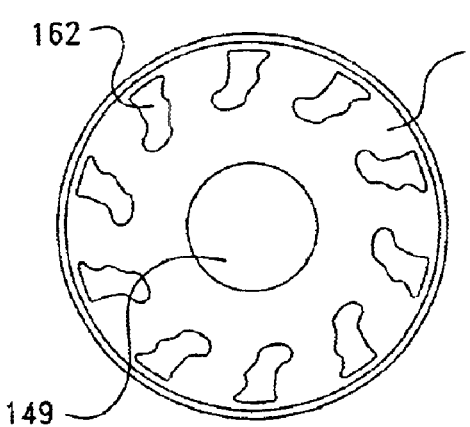 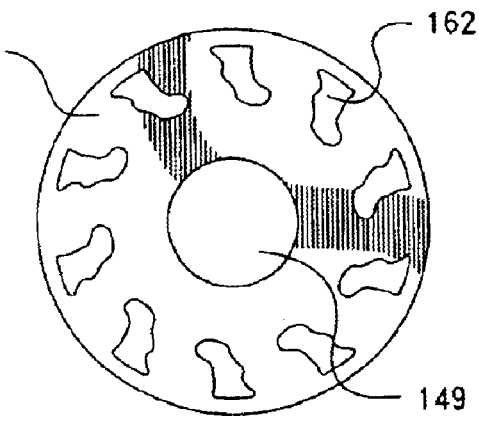
Fig. 17a	Fig. 17b

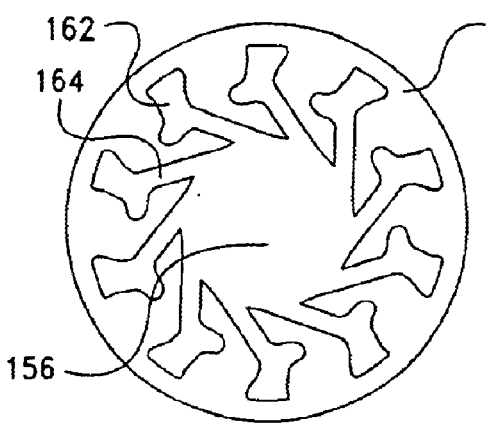
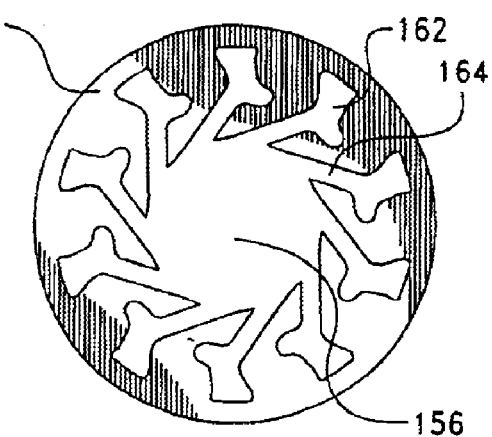
Fig. 27a        Fig. 27b
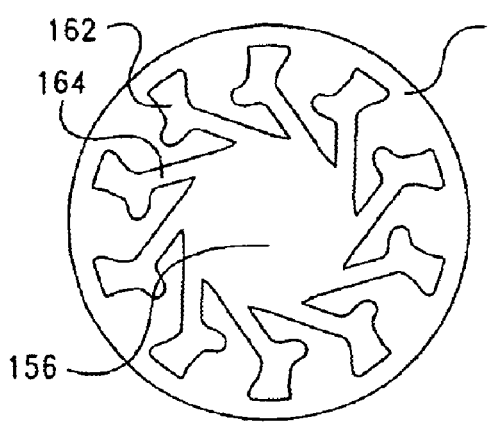
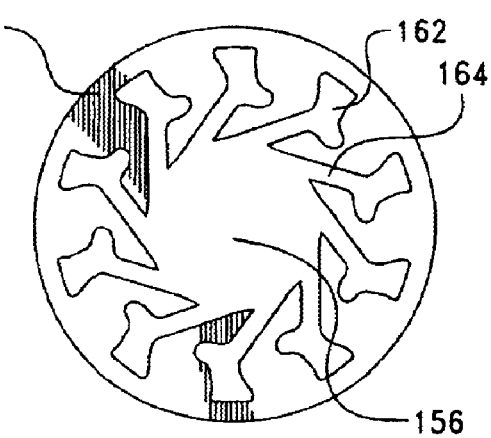
Fig. 28a        Fig. 28b
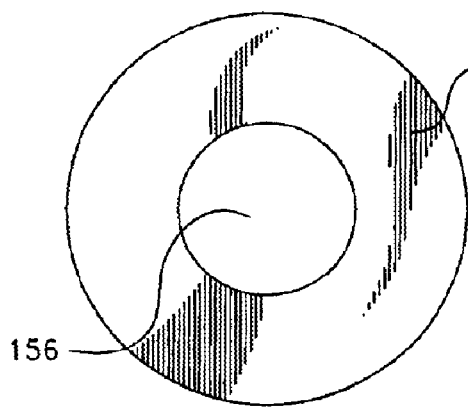
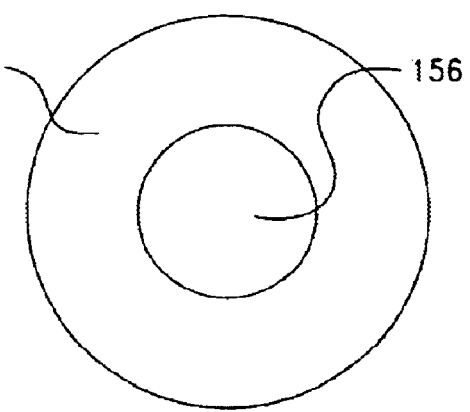
Fig. 29a        Fig. 29b

MULTI-FUNCTION SIMPLEX/PREFILMER NOZZLE

CROSS-REFERENCE TO RELATED CASES

The present application claims the benefit of the filing date of U.S. Provisional Application Ser. No. 60/365,079, filed Mar. 15, 2002; and U.S. Provisional Application Ser. No. 60/434,170, filed Dec. 17, 2002, the disclosures of which are expressly incorporated herein by reference.

FIELD OF THE INVENTION

The present invention relates generally to spray nozzles, and more particularly, to spray nozzles useful for introducing one or more fluids into engines, and particularly into gas turbine combustion engines.

BACKGROUND OF THE INVENTION

Gas turbine engines typically include a compressor section for compressing inlet air, a combustion section for combining the compressed air with fuel and combusting the fuel, and a turbine section where the energy from the hot gas produced by the combustion of the fuel is converted into work. The exhaust gas from the turbine section can also be used to achieve thrust or as a source of heat and energy.

Spray nozzles are commonly used to introduce the fuel as droplets into the combustion section. However, another known application for spray nozzles is to introduce water (or other appropriate fluid) as droplets ("fog") into the compressor inlet air stream to reduce the temperature of the air by evaporation. Fog systems spray ultra-fine water droplets into the inlet duct of the gas turbine. Most droplets evaporate quickly, cooling the inlet air stream, raising mass flow, and boosting turbine capacity. Some droplets pass through the inlet duct and are ingested in the compressor. Typically, the droplets evaporate rapidly inside the compressor, which prevents erosion damage to the compressor components, and which provides an added power boost from the cooling effect.

Such an application, conventionally referred to as "wet compression", is particularly useful with land-based power generation units, and has been adopted in a number of operations. Resort may be had to U.S. Pat. Nos. 6,216,443 and 5,867,977 for examples and discussion of such power generation units, and the location of such spray nozzles. Also, U.S. Pat. No. 5,121,596 describes using such wet compression technique particularly at the time of starting the turbine to reduce thermal stress and surface oxidation of component parts.

Spray nozzles are also used to clean the turbine blades and other components in the engine during engine operation and/or after shut-down. Compressor blades are also typically provided in the compressor section to compress the inlet air. In such applications, the spray nozzles are used to periodically deliver water (or other appropriate fluid such as a chemical cleaning mixture) as droplets against the turbine blades and other internal compressor components, to remove build-ups of contaminants. U.S. Pat. No. 5,867,977, for example, describes such a cleaning process.

As should be appreciated from the above, spray nozzles have a variety of applications in engines, and in particular gas turbine engines, and much has been done to design spray nozzles which are useful for some if not all of the above applications. With the requirements of the spray nozzles for the different applications being significantly different and sometimes at odds with each other (e.g., the cleaning process generally requires larger liquid droplets, while the cooling process generally requires finer droplets), it has sometimes been necessary to mount various nozzle sets within the engine, with certain nozzles being capable of conducting one function, and other nozzles being capable of conducting other functions. It has been a continuing challenge to develop a single spray nozzle which can be used for more than one application, e.g., as a cooling device to introduce fluid into the engine for cooling purposes, and as a cleaning device to introduce fluid into the engine for cleaning purposes. This can result in a more compact engine design, lower cost for the spray system, and less maintenance and repair, all of which can reduce the overall cost of the engine.

It is therefore believed there is a demand in the industry for such a multi-function spray nozzle, and particularly one which can satisfy the requirements as a cooling device and as a cleaning device. Moreover, it is believed there is a continuing demand for spray nozzles useful for engine applications which are relatively straightforward to manufacture and assemble; and which are replicatable, in that the nozzles are generally alike, and the manufacturing can be closely controlled, so that the efficiency and operation of the nozzles is known.

SUMMARY OF THE PRESENT INVENTION

The present invention provides a novel and unique multi-function spray nozzle for engine applications that is particularly useful i) as a cooling device to introduce fluid into the engine for cooling purposes, and ii) as a cleaning device to introduce a fluid into the engine. The spray nozzle is relatively straightforward to manufacture and assemble, and is replicatable, so that the efficiency and operation of the nozzles can be known and controlled.

The spray nozzle includes a nozzle assembly for delivering one or two fluids, depending on whether the spray nozzle is used as a cleaning or cooling device (or both). In one embodiment, the assembly includes a male connector or fitting connectable within a fluid system for receiving a first fluid such as water; a T-connector including a male connector and nut connectable within a fluid system for receiving a second fluid such as air; and an extension assembly which directs the first and/or second fluids and includes a nozzle tip, for dispensing the first and/or second fluids.

The nozzle tip includes a multi-layered arrangement of etched plates defining flow paths for the first and second fluids. According to a first embodiment of the present invention, the nozzle tip comprises an airblast simplex nozzle, whereby the plates define non-radial feed slots which direct the first fluid (e.g., water) into a cylindrical, bowl-shaped swirl chamber centrally located along the axis of the nozzle. The fluid is caused to swirl in the swirl chamber, and the swirling fluid then exits the swirl chamber through a central spray orifice, which creates a hollow, cone-shaped spray. The slots, chamber and orifice create a spray with relatively large droplets, which can the pass through a cylindrical passage and out through the tip of the nozzle.

The plates also define other non-radial feed slots which direct the second fluid (e.g., air) in a swirling manner into the cylindrical passage—downstream from the spray orifice. The second fluid provides better atomization, uniform mixing, and additional momentum and swirling components of motion to the first fluid spray. The swirling, conical spray then exits the nozzle tip in a fine dispersion of droplets.

During operation of the spray nozzle as a cooling device for an engine, the spray nozzle is mounted in the compressor or other appropriate location, typically in an annular arrangement with other nozzles, and the first and second fluids are directed through the spray nozzle. The fine, uniform dispersion of the fluid through the spray nozzle efficiently reduces the temperature of the inlet air through rapid evaporation or the first fluid, increases the mass flow, and provides inter-stage cooling, which thereby increases the efficiencies of the combustion processes, and overall, increases the power output of the gas turbine engine.

During operation of the spray nozzle as a cleaning device, only the first fluid is directed through the nozzle tip. The flow of the second fluid is suspended. This results in a spray with a relatively large droplet size being directed from the nozzle, which is particularly useful for cleaning the internal components of the engine, such as the blades in the compressor. The spray nozzle is operated in this mode for as long as necessary, and when it is again desirable to use the nozzle as a cooling device, the second fluid flow is then resumed.

According to a second embodiment of the present invention, the nozzle comprises a prefilming airblast nozzle, whereby one of the plates defines a prefilmer lip. Non-radial feed slots are also used in this embodiment to introduce the first fluid in a swirling manner into a cylindrical swirl passage, as well as to introduce the second fluid in a swirling manner into the swirl passage, downstream of the first fluid. The swirling first fluid forms a thin sheet on the prefilmer, which then releases from the prefilmer and is impacted by the swirling second fluid, and then exits the nozzle in a fine dispersion of droplets, as in the first embodiment.

As in the first embodiment, the second fluid flow can be suspended, whereby the resulting spray has a larger droplet size, and can be used for cleaning internal components in the engine. Otherwise, the fine, swirling dispersion formed by the first and second fluids can be used for reducing the temperature of the fluid stream, increasing the mass flow, and providing inter-stage cooling, to increase the power output of the engine.

The plates of the nozzle tip are formed such as by chemical or electrochemical etching, which provides detailed, efficient, repeatable flow passages and orifices, and provides for relatively easy manufacturing. The etched plates also enable the nozzle tip to be relatively easily manufactured and assembled.

The present invention thereby provides a novel and unique multi-function spray nozzle which can be used i) as a cooling device to introduce a fluid into the fluid stream of the engine for cooling purposes; and ii) as a cleaning device to introduce a fluid into the engine for cleaning purposes or any combination thereof. The spray nozzle is relatively straightforward to manufacture and assemble, and is replicatable.

Other features and advantages of the present invention will become further apparent upon reviewing the following specification and attached drawings.

BRIEF DESCRIPTION OF THE DRAWINGS

FIG. 11A is a rear view of a seventh plate of the plate stack;

FIG. 11B is a front view of the seventh plate;

FIG. 12A is a rear view of a eighth plate of the plate stack;

FIG. 12B is a front view of the eighth plate;

FIG. 13A is a rear view of a ninth plate of the plate stack;

FIG. 13B is a front view of the ninth plate;

FIG. 14A is a rear view of a tenth plate of the plate stack;

FIG. 14B is a front view of the tenth plate;

FIG. 15A is a rear view of a eleventh plate of the plate stack;

FIG. 15B is a front view of the eleventh plate;

FIG. 17A is a rear plan view of a first plate of the plate stack for the nozzle tip of FIG. 16;

FIG. 17B is a front plan view of the first plate;

FIG. 27A is a rear view of a eleventh plate of the plate stack;

FIG. 27B is a front view of the eleventh plate;

FIG. 28A is a rear view of the twelfth plate;

FIG. 28B is a front view of the twelfth plate;

FIG. 29A is a rear view of a thirteenth plate of the plate; and

FIG. 29B is a front view of the thirteenth plate.

DETAILED DESCRIPTION OF THE PREFERRED EMBODIMENT

Figure 1:
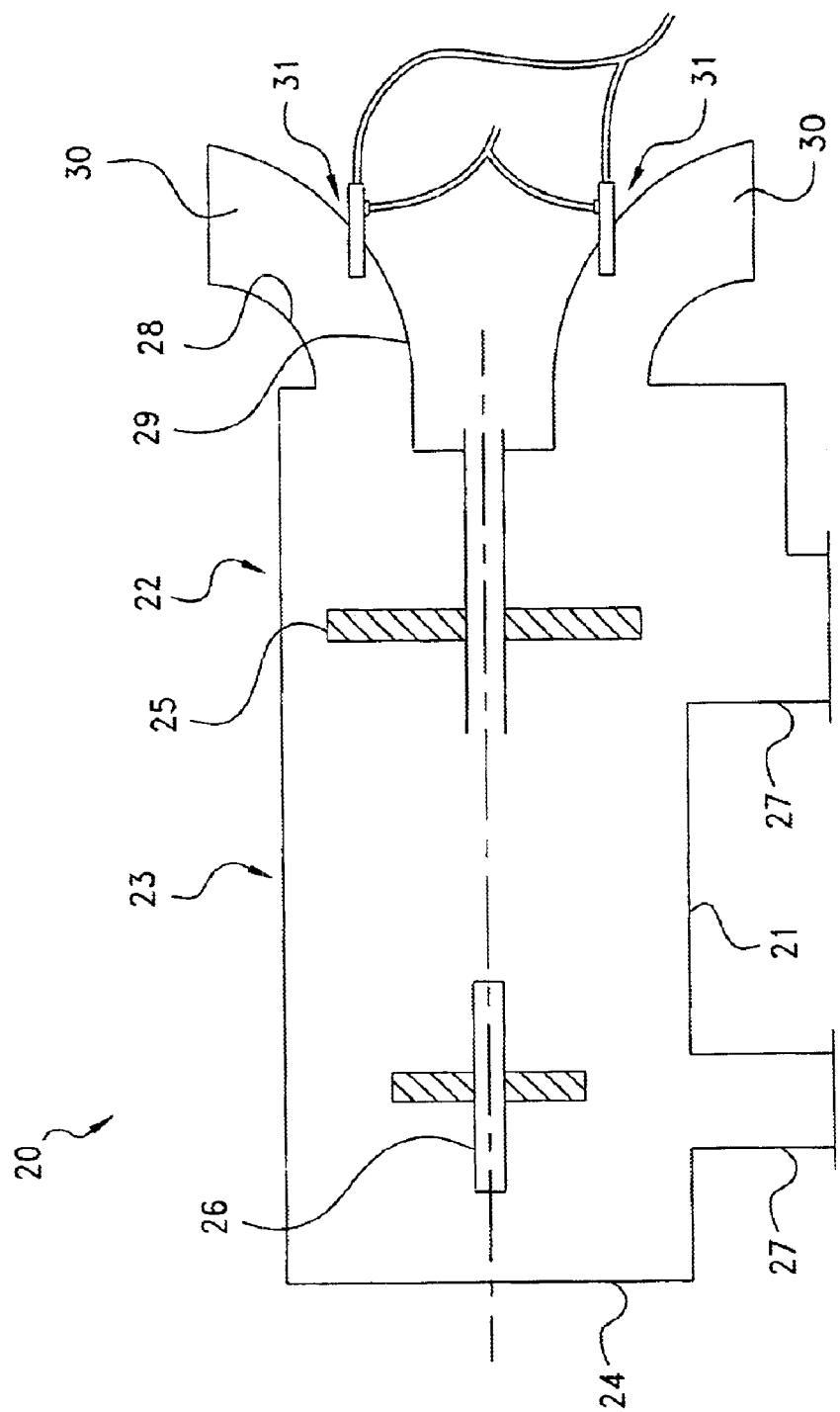
FIG. 1 is a schematic illustration of an engine shown including a pair of spray nozzle assemblies constructed according to the present invention.

Referring to the drawings and initially to FIG. 1, an engine is shown generally at 20, which in a preferred embodiment, is a gas turbine engine. The engine 20 includes a casing 21 defining an upstream compressor section, indicated generally at 22; a turbine section, indicated generally at 23; and a downstream exhaust end 24. Compressor blades 25 and turbine blades 26 are schematically represented in the compressor section 22 and the turbine section 23, respectively, and are mounted for rotation on a common or separate shaft. The engine can be supported in a convention manner, such as by legs 27.

The casing includes a bell mouth 28 at its upstream end, which together with a bell housing 29, define inlet air passages 30 into the engine. Spray nozzle assemblies useful with the engine 20 and constructed according to the principles of the present invention are indicated generally at 31, and are mounted at an appropriate location within the bell mouth, the bell housing, or directly to the casing. The spray nozzle assemblies 31 are particularly useful with such a gas turbine engine, however it should be appreciated that it could be useful for other types of gas turbine engines, other types of engines generally, and in non-engine applications.

Figure 2:
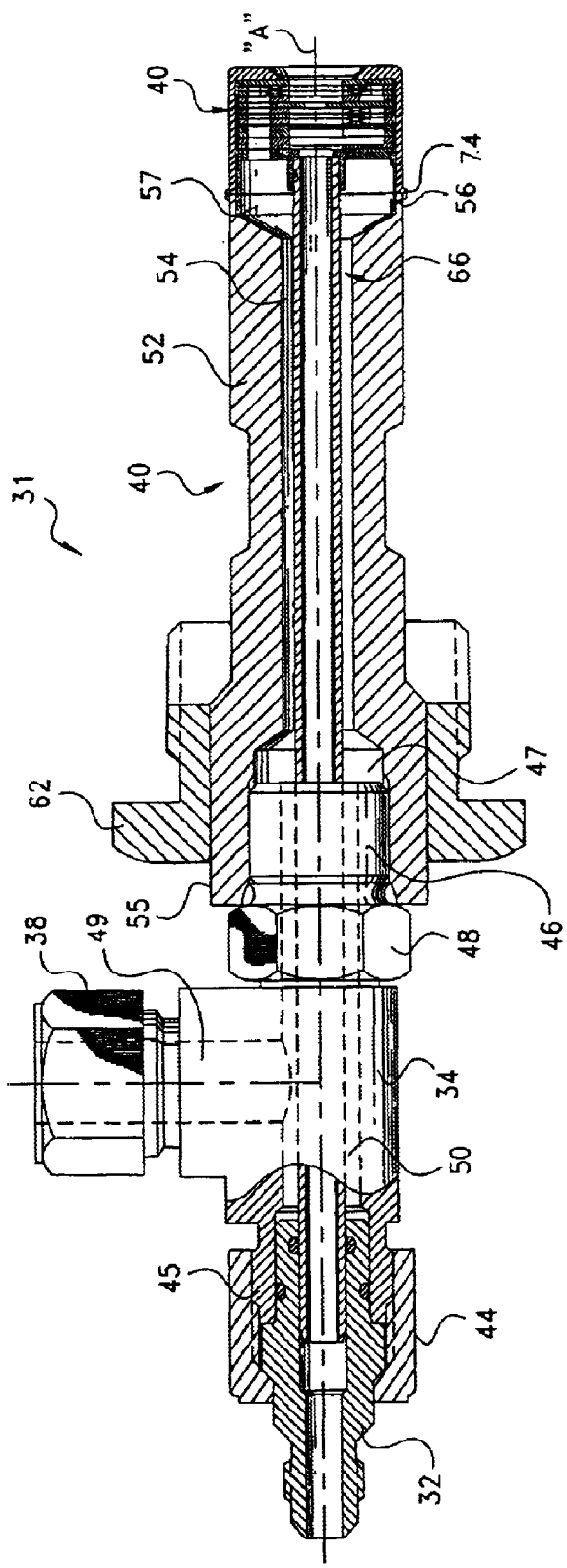
FIG. 2 is a cross-sectional side view of a spray nozzle assembly for the engine of FIG. 1.

In any case, referring now to FIG. 2, in one embodiment, the spray nozzle 31 includes a male connector or fitting 32 connectable within a fluid system and defining a first port for receiving a first fluid; a T-connector 34 including a male connector with a nut 38 connectable within a fluid system and defining a second port for receiving a second fluid; and an extension assembly, indicated generally at 40, which directs the first and/or second fluids and includes a nozzle tip, indicated generally at 42, for dispensing the first and/or second fluids.

The fitting 32 is connectable to the T-connector 34 with a first nut 44, which surrounds a first elongated collar 45, projecting outwardly from one side of the T-connector. Fitting 32, collar 45 and nut 44 can be threaded to allow easy connection and disconnection of these components, as is conventional.

A second elongated collar 46 projects outwardly from the other side of the T-connector, and is threadably received in a counterbore 47 in the extension assembly 40. A second nut 48 is provided with T-connector 34 to enable easy access with a tool to connect and/or disconnect the T-connector and the extension assembly 40, as is also conventional.

A first passage 49 extends inwardly from port 38 and perpendicularly intersects a through-passage 50 extending from collar 45 to collar 46.

It is noted that the T-connector 34 is only shown for exemplary purposes, as one useful, conventional structure for directing a first and second fluid to the extension assembly. Other connector structures may also be used as should be known to those skilled in the art.

The extension assembly 40 further includes an elongated body 52 comprised of material appropriate for the particular application, and having a central cylindrical bore 54 disposed along the central axis "A" of the nozzle. Bore 54 opens at an upstream end 55 to enlarged counterbore 47, and at its downstream end 56 to enlarged counterbore 57. The length and other dimensions of body 52 can vary depending upon the particular application.

A threaded nut 62 can be rotatingly provided on extension assembly 40 to enable the nozzle assembly to be mounted and secured within an opening in the housing of a compressor, or in another appropriate location in the engine. Extension assembly 40 can be moved axially upstream and downstream within nut 62 to provide optimal spray dispersion. Nut 62 includes appropriate geometry to enable rotation by a wrench or other common tool.

Figure 3:
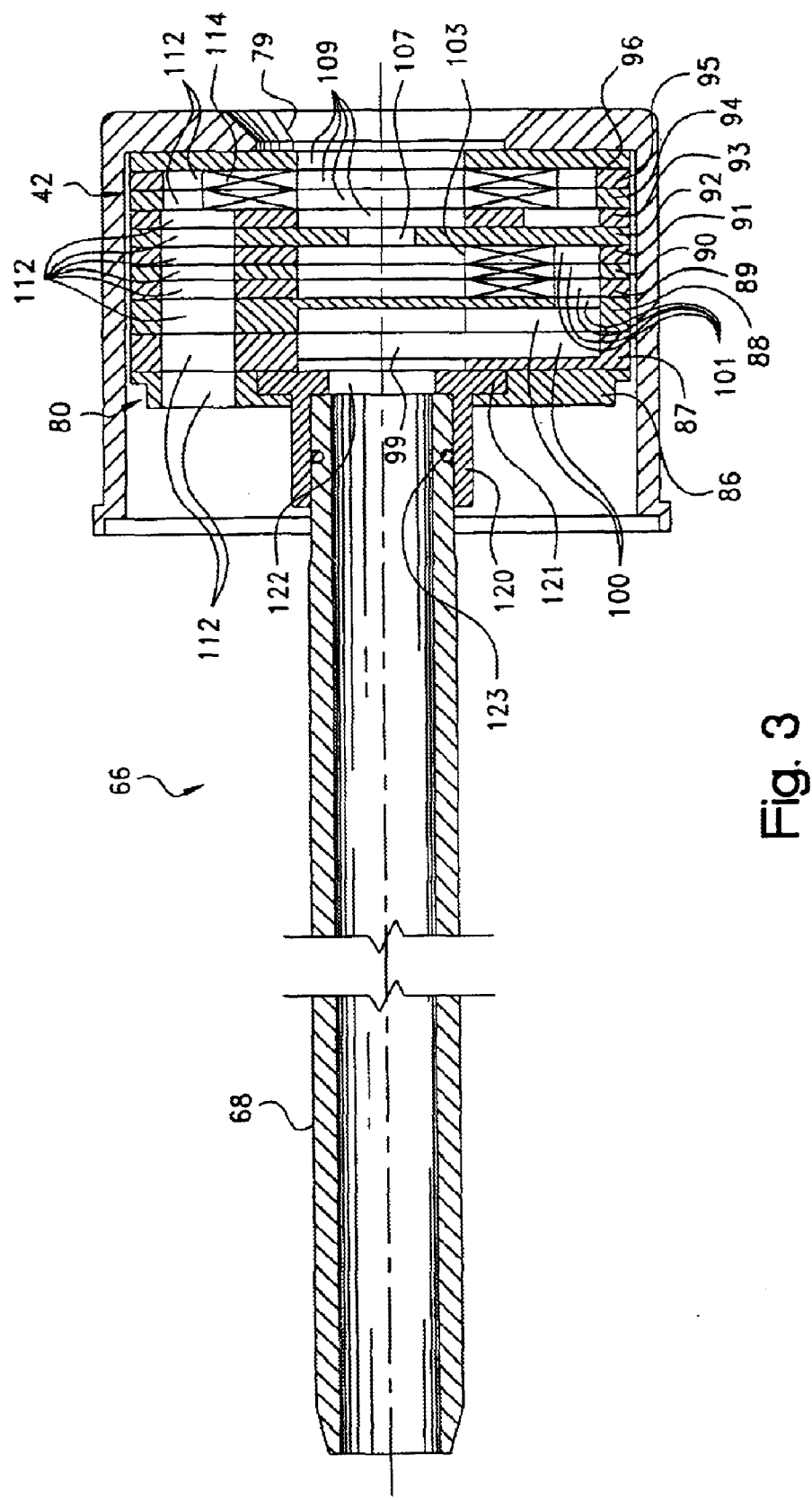
FIG. 3 is cross-sectional side view of the inside extension sub-assembly of the spray nozzle assembly.

As shown also in FIG. 3, an inside extension subassembly, indicated generally at 66, is received internally of extension 40. Inside extension subassembly 66 includes an elongated tube 68 and nozzle tip 42. Tube 68 projects through bore 54, and is received internally of male connector 32 to fluidly interconnect the male connector 32 (the first port) and the nozzle tip 42 to provide a flow path for the first fluid from the first port through the extension. The tube 68 also defines a second flow path for the second fluid, separate from the first flow path and external to the tube 68, from the male connector 38 (second port) through passage 49, passage 50, counter bore 47, and counter bore 57 to tip 42.

Figure 4:
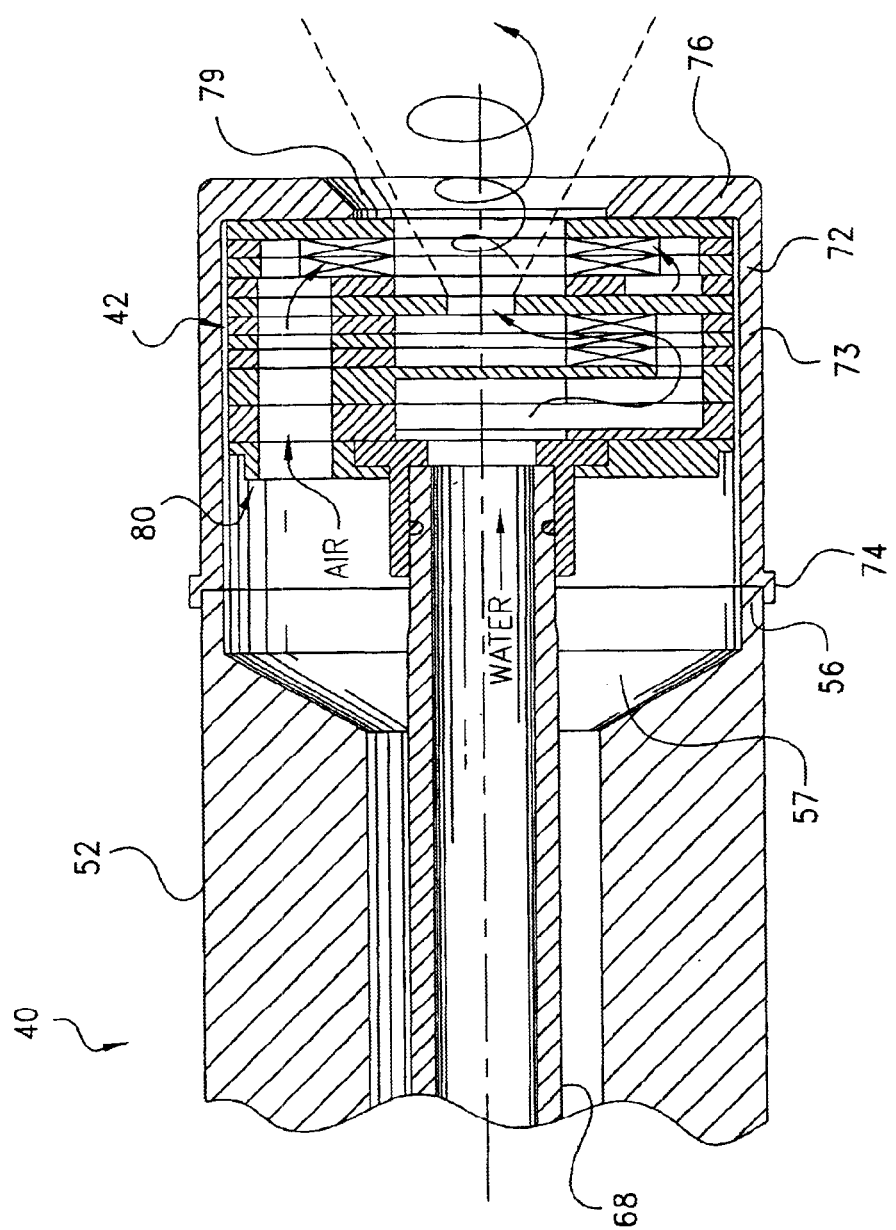
FIG. 4 is cross-sectional side view of the nozzle tip of the spray nozzle of FIG. 2.
Figure 5A:
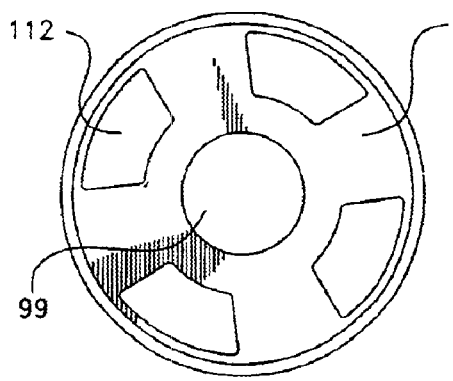
FIG. 5A is a rear (upstream) plan view of a first plate of the plate stack for the nozzle tip.
Figure 5B:
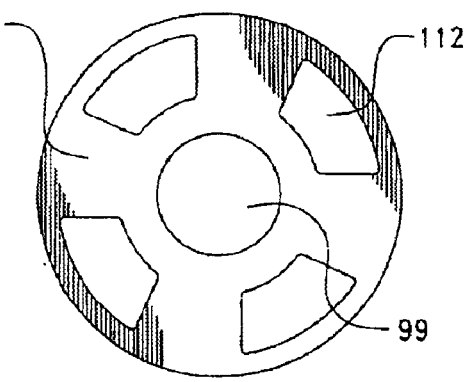
FIG. 5B is a front (downstream) plan view of the first plate.
Figure 6A:
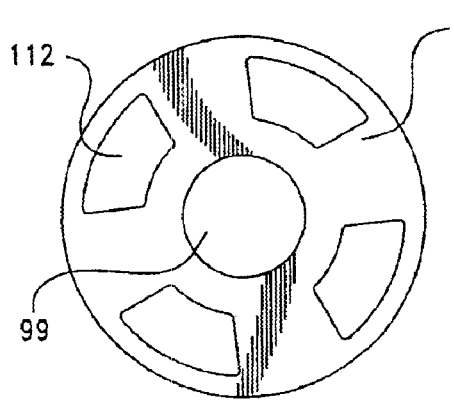
FIG. 6A is a rear plan view of a second plate of the plate stack.
Figure 6B:
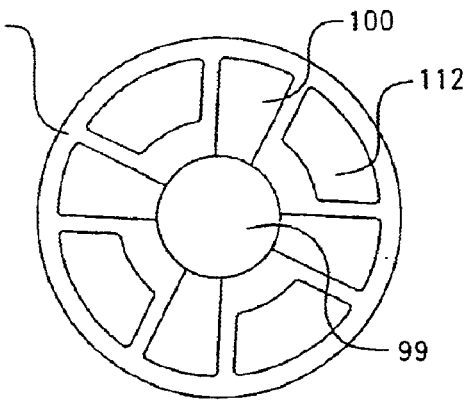
FIG. 6B is a front view of the second plate.
Figure 7A:
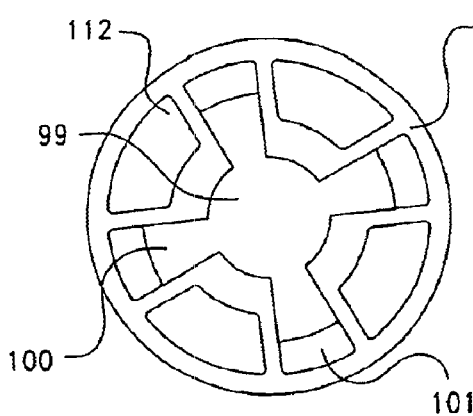
FIG. 7A is a rear view of a third plate of the plate stack.
Figure 7B:
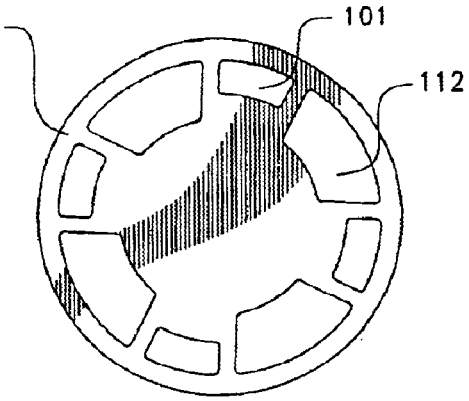
FIG. 7B is a front view of the third plate.
Figure 8A:
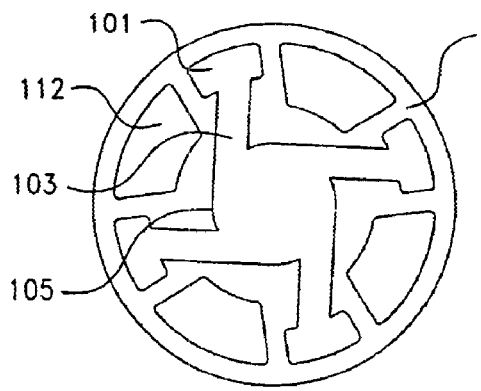
FIG. 8A is a rear view of a fourth plate of the plate stack.
Figure 8B:
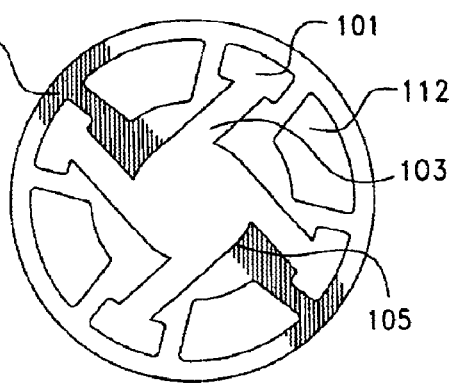
FIG. 8B is a front view of the fourth plate.
Figure 9A:
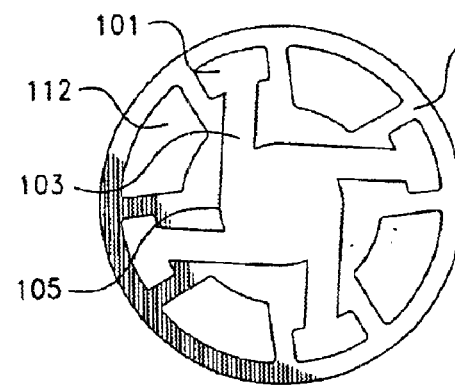
FIG. 9A is a rear view of a fifth plate of the plate stack.
Figure 9B:
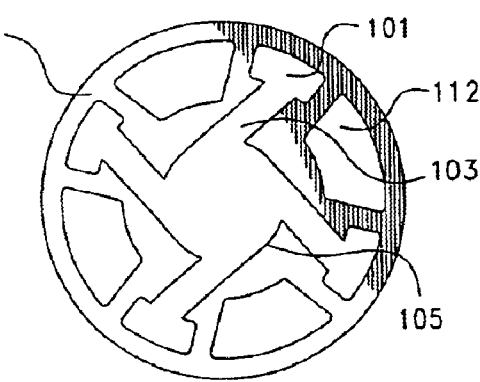
FIG. 9B is a front view of the fifth plate.
Figure 10A:
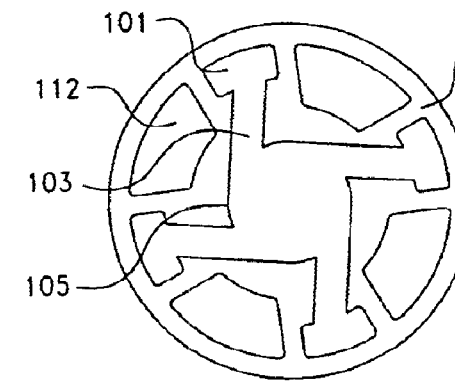
FIG. 10A is a rear view of a sixth plate of the plate stack.
Figure 10B:
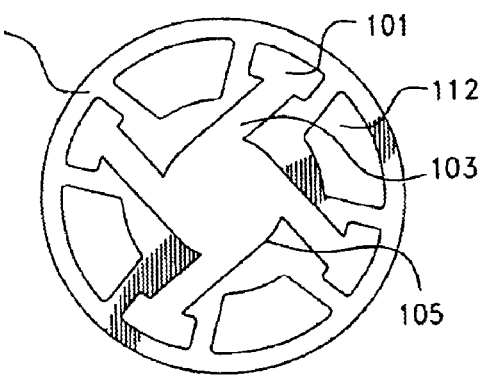
FIG. 10B is a front view of the sixth plate.

As shown in FIGS. 3 and 4, the inside extension assembly 66 further includes a cup-shaped cover or cap 72 having an annular body 73 with an upstream annular end 74 receiving and fixed to, such as by brazing or threading the downstream end 56 of the extension body 52; and a downstream annular end wall 76 with a central circular opening 79. The central opening 79 is preferably outwardly-tapered.

Closely received within the cover 72 is a plate stack, indicated generally at 80, which defines flow paths through the nozzle tip for the first and second fluids. In the first embodiment of the present invention, illustrated in FIGS. 2–4, the plate stack 80 includes a plurality of circular plates 86–96, properly aligned with one another, located in surface-to-surface adjacent relation, and bonded to each other such as by high temperature brazing or other appropriate bonding technique, such as described in U.S. Pat. No. 6,321,541, which is incorporated herein by reference. Each plate in the plate stack, as will be described below, preferably includes a portion of at least one of the flow paths.

Referring now to FIGS. 5A–15B, each plate 86–96 in the plate stack is illustrated. By properly aligning and locating the plates in adjacent, surface-to-surface relation, circular passages as at 99 are provided through the plates 86–88 (FIGS. 5A–7A) of the stack generally along the central axis of the nozzle. Passages 99 are connected through lateral passages as at 100 in plates 87, 88 (FIGS. 6B–7A), to second arcuate (in cross-section) passages as at 101 in plates 88–91 (FIGS. 7A–10B), extending generally parallel to the central axis. The second axial passages 101 feed a series of lateral passages as at 103 in plates 89–91 (FIGS. 8A–10B). Passages 103 non-radially (tangentially) intersect a central cylindrical swirl chamber as at 105 in plates 89–91 (FIGS. 8A–10B), such that fluid directed into the swirl chamber has a swirling component of motion.

A circular spray orifice 107 is located in plate 92 (FIGS. 11A, 11B), at the downstream end of the swirl chamber along the central axis of the nozzle, which is then followed by cylindrical passages as at 109 in plates 93–96 (FIGS. 12A–15B), also co-axially located generally along the axis of the nozzle, to deliver the fluid in a hollow, cone-shaped spray (as in, e.g., FIG. 4).

The description above of the passages 99, 100, 101, 103, 105, 107 and 109 in plates 86–96 defines the first flow path for the first fluid from tube 68 through the nozzle tip 42. Fluid, such as water, directed through this path in sufficient volumes and velocities, creates a relatively uniform dispersion of droplets, which have a relatively large size. Such a spray can be used for cleaning surfaces of components of the compressor, and as such, when (solely) a first appropriate fluid is directed through the nozzle along tube 68 to the nozzle tip 42, the nozzle can be used as a cleaning device for internal components of the compressor and/or other components of a gas turbine engine. The time necessary for the cleaning action to be sufficient, of course varies from application-to-application. It is believed it could be as short as five to fifteen minutes once a day for a large-scale commercial power generating unit.

The other aspect of the invention is that the nozzle can also be used as a cooling device for compressor air. To this end, axial passages as at 112 are provided in plates 86–95 (FIGS. 5A–14B), offset from but generally parallel to the central axis of the nozzle. Lateral feed slots as at 114 are provided in plates 94 and 95 (FIGS. 13A–14B) downstream from the spray orifice 107, to direct the flow inwardly, and non-radially (tangentially) into axial passages 109. Slots 114 are preferably oriented such that the fluid directed through these slots is directed in the same rotational direction as the first fluid; however, the slots can also be oriented such that the second fluid is provided in an opposite rotational direction.

The passages 112, 114 and 109 define the second flow path through the nozzle for the second fluid from the extension assembly 40 to the nozzle tip 42. When a second fluid, such as air, is directed through the passages in sufficient volumes and velocities, the air provides further atomization of the spray cone, and uniformly mixes the spray, to create a fine dispersion. The air also adds additional momentum and can add further swirling components of motion to the spray. Such a spray can be useful for efficiently cooling an inlet air stream into the compressor (or generally for cooling any engine fluid stream), and as such, when first and second fluids are directed simultaneously through the nozzle to the nozzle tip 42, the nozzle can be used as a cooling device for the compressor air of a gas turbine engine to increase the power output of the engine.

The relative droplet size produced during the cleaning mode versus the cooling mode will vary depending on the dimensional characteristics and requirements of the engine. In one commercial power generation application it is believed that the difference in droplet size of the two modes could be as much as 2000 percent (e.g., 10 SMD in the cooling mode versus 150–200 SMD in the cleaning mode), but again, this depends upon the desired droplet size for efficient cleaning, as well as the desired droplet size for appropriate cooling.

It should be appreciated by those skilled in the art, that the plate stack 80 described above defines a "simplex" nozzle, that is, one which has a spray created by means of liquid-pressure swirl through a defined opening, which is air-assisted (airblast) when the second fluid is introduced through the nozzle. As will be described below, other conventional nozzle structures can alternatively be used.

An annular adapter 120 fluidly couples the plate stack 80 to the tube 68 and is attached thereto such as by press-fit, threads, or brazing. A radial flange 121 of the adapter can be located and fixed between plates 86 and 87, as illustrated in FIG. 3, and defines a central opening 122 to allow fluid to flow from tube 68 to axial passage 99. A braze ring is illustrated at 123 between the adapter and the tube to fix the tube to the adapter, and to prevent leakage.

The plates 86–96 are preferably formed by etching, and preferably by chemical or electro-chemical etching through thin sheets of etchable material, e.g., metal or ceramic sheets, and then layering the plates in aligned, surface-to-surface adjacent relation with each other and mechanically holding them together, such as by bonding, e.g., brazing, welding or diffusion bonding. Further discussion of chemically and electrochemically etching passages and orifices such as described above in thin metal plates can be found in U.S. Pat. Nos. 5,435,884 and 5,740,967, which are incorporated herein by reference. The etching process has advantages in producing fine and detailed passages, which provide efficient flow and are repeatable so as to provide uniformity of parts. The number and arrangement of plates, and their geometries, can of course vary, depending upon the particular application. Other conventional etching techniques, which should be known to those skilled in the art, are also possible. Conventional forming (e.g., machining) any or all of the plates, while less preferred, is also an option.

While a hollow conical air atomized spray is described above, it should be appreciated that other nozzle designs could alternatively (or in addition) be used with the present invention to provide other spray geometries, such as plain jet, solid cone, flat spray, formed sprays, etc. Also, while a round spray orifice 107 is shown in plate 92, it should be appreciated that the dimensions and geometries of the spray orifice could vary to tailor the spray volume to the particular application.

The spray nozzle described above is mounted in or near the compressor or other appropriate location in the engine. Typically a number of such spray nozzles are mounted in an evenly-spaced, annular arrangement—with the number and spacing of such nozzles depending upon the flow requirements through the engine and the desired cleaning/cooling. The spray nozzle is connected within the fluid supply system in an appropriate manner, and appropriate valves are used to control the introduction of the fluids into the spray nozzle. The spray nozzle(s) are operated with only a first fluid being directed through the nozzle along the first flow path during the cleaning process; and with both fluids directed through the nozzle along the first and second flow paths during the cooling process of the compressor inlet air. Again, the volumes and velocities of fluids, and time necessary for each mode of operation are dependent upon the particular application.

Figure 16:
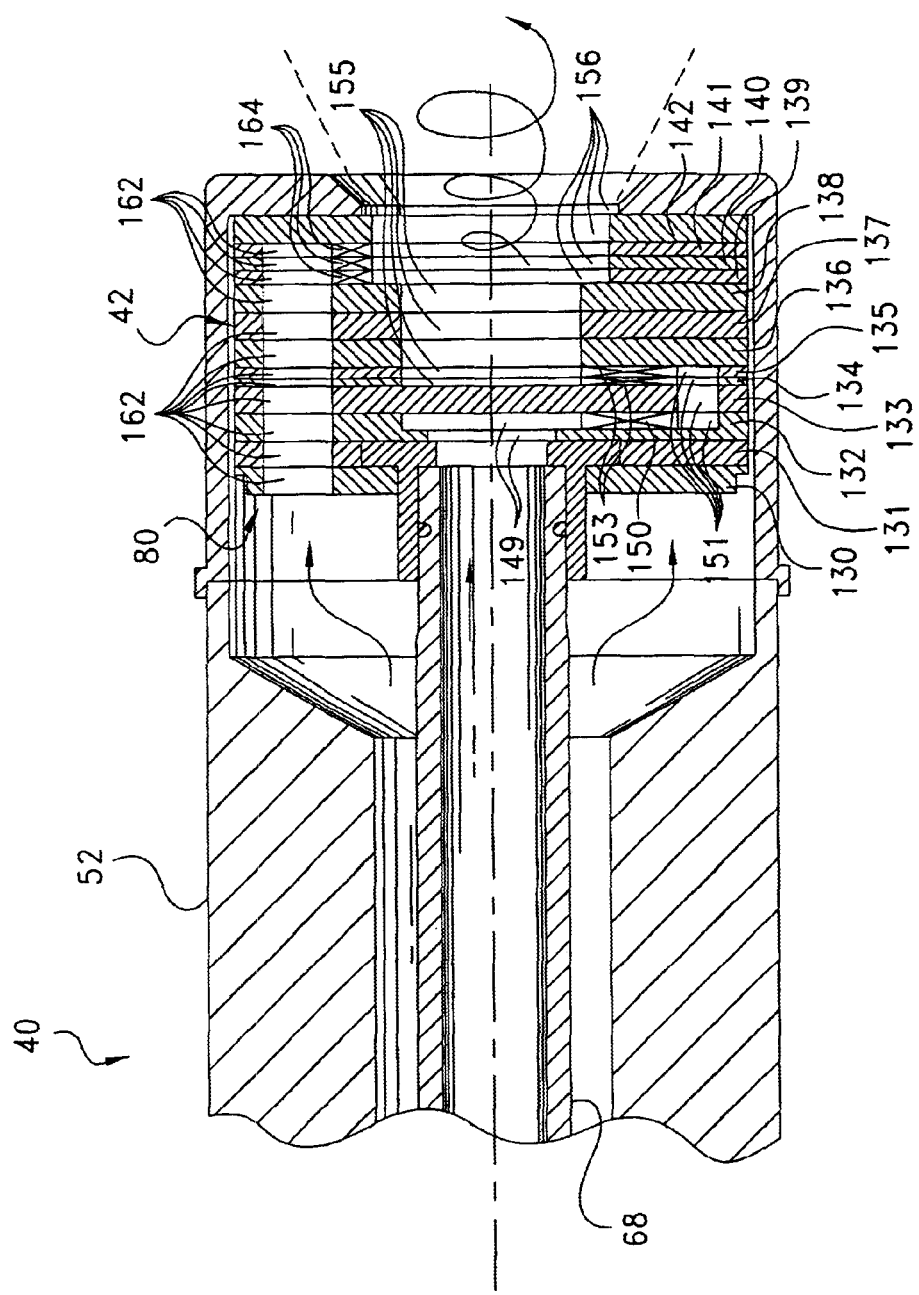
FIG. 16 is a cross-sectional side view of the nozzle tip of the spray nozzle constructed according to a second embodiment of the present invention.
Figures 18A, 18B:
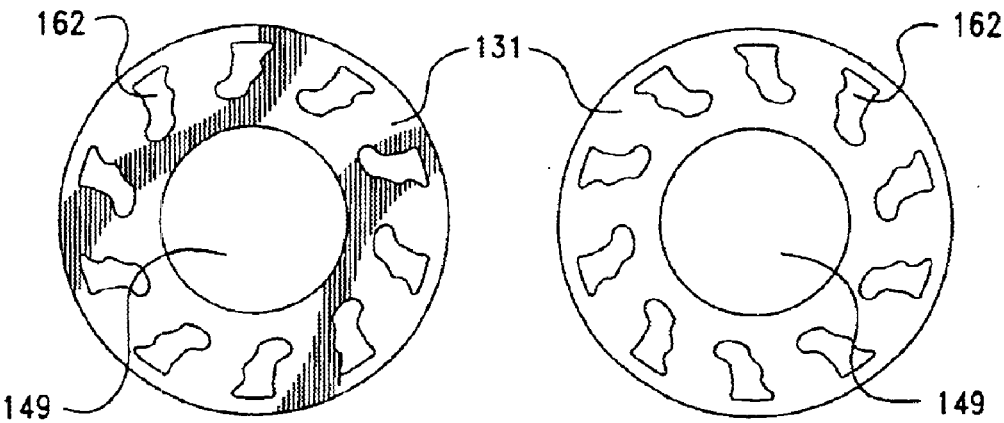
FIG. 18A is a rear view of a second plate of the plate stack.
FIG. 18B is a front view of the second plate.
Figures 19A, 19B:
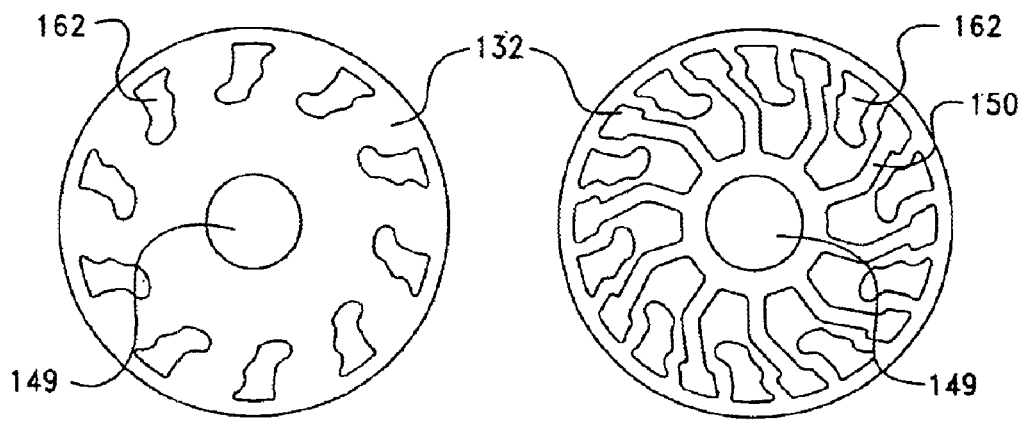
FIG. 19A is a rear view of a third plate of the plate stack.
FIG. 19B is a front view of the third plate.
Figures 20A, 20B:
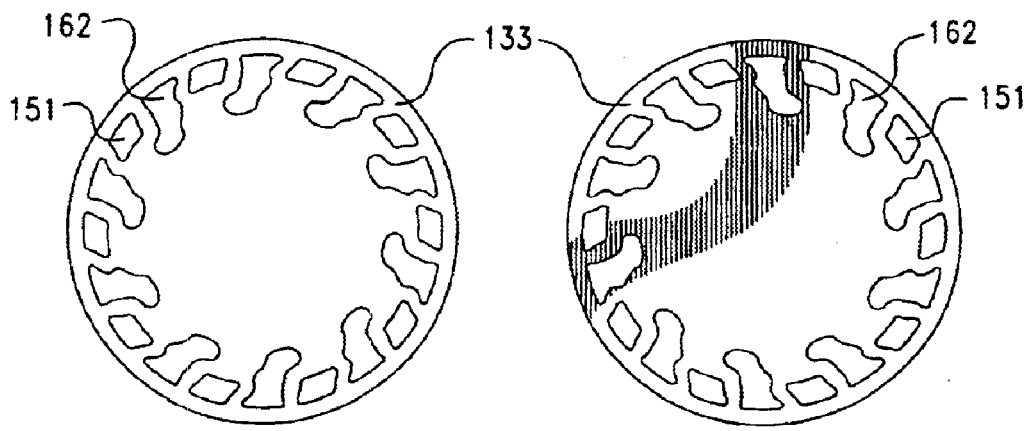
FIG. 20A is a rear view of a fourth plate of the plate stack.
FIG. 20B is a front view of the fourth plate.
Figures 21A, 21B:
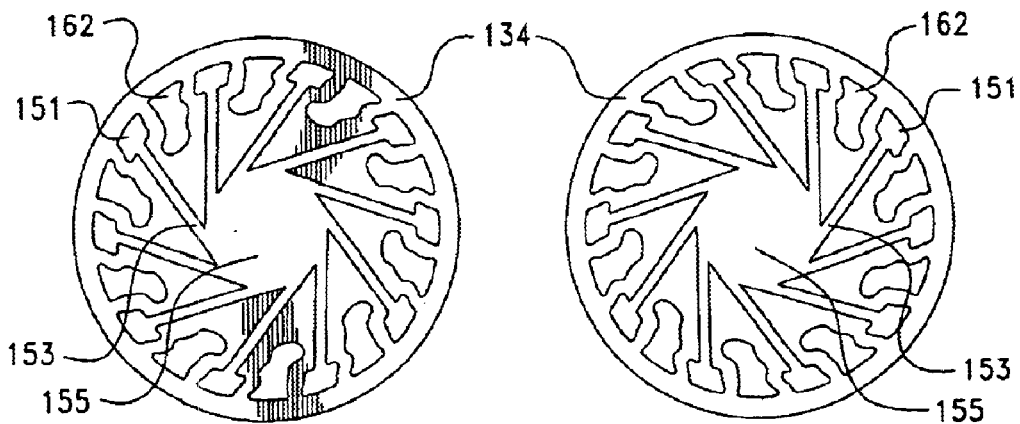
FIG. 21A is a rear view of a fifth plate of the plate stack.
FIG. 21B is a front view of the fifth plate.
Figures 22A, 22B:
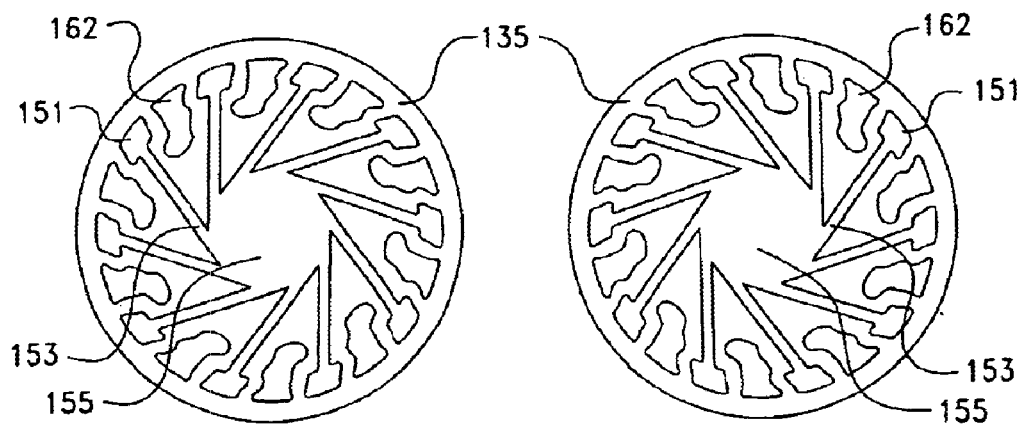
FIG. 22A is a rear view of a sixth plate of the plate stack.
FIG. 22B is a front view of the sixth plate.
Figures 23A, 23B:
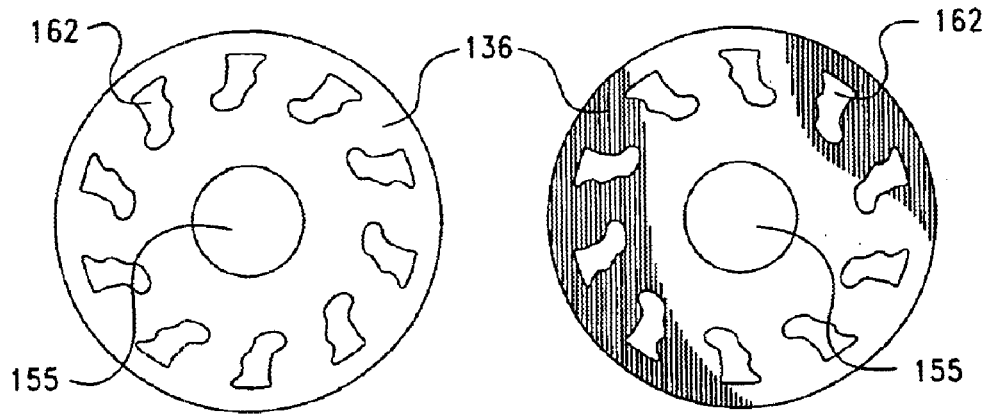
FIG. 23A is a rear view of a seventh plate of the plate stack.
FIG. 23B is a front view of the seventh plate.
Figures 24A, 24B:
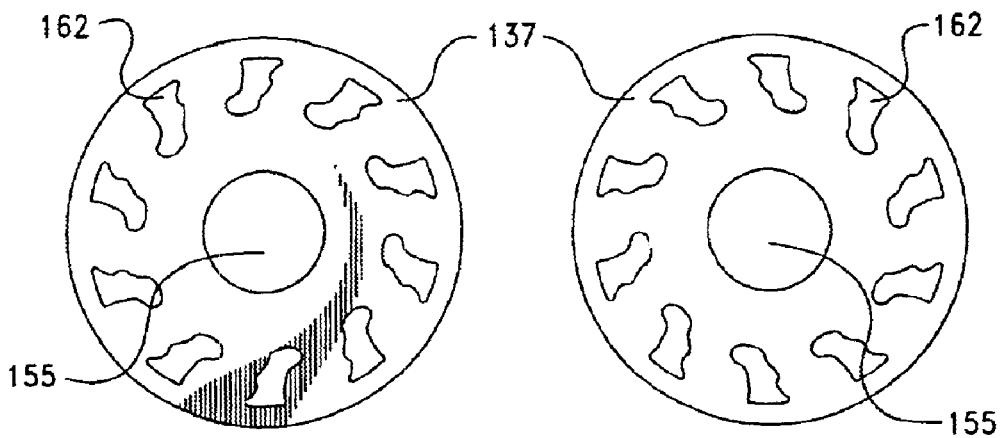
FIG. 24A is a rear view of a eighth plate of the plate stack.
FIG. 24B is a front view of the eighth plate.
Figures 25A, 25B:
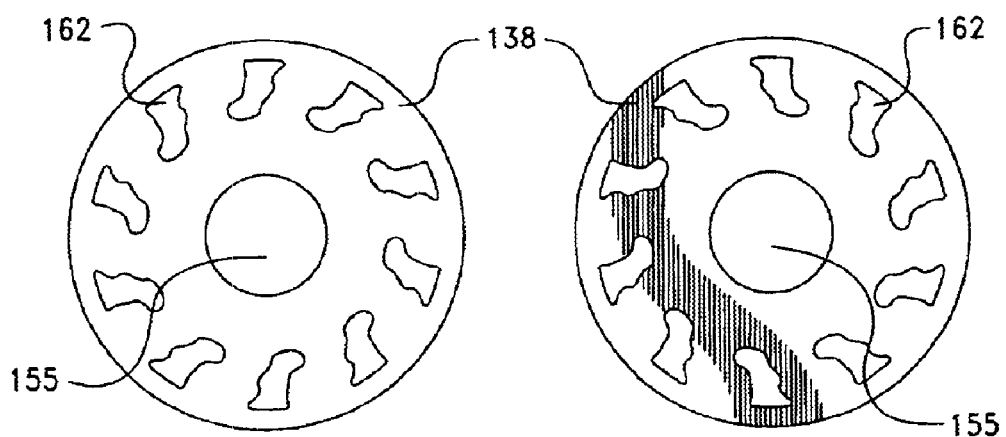
FIG. 25A is a rear view of a ninth plate of the plate stack.
FIG. 25B is a front view of the ninth plate.
Figures 26A, 26B:
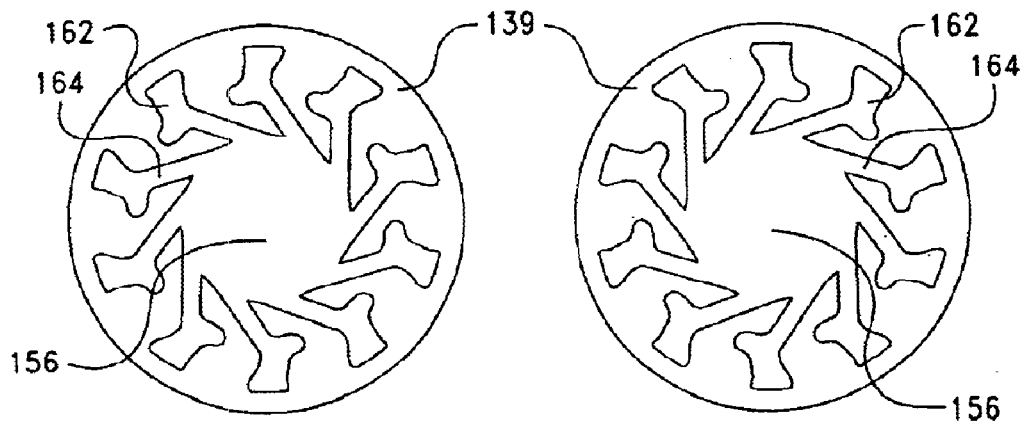
FIG. 26A is a rear view of a tenth plate of the plate stack.
FIG. 26B is a front view of the tenth plate.

Referring now to FIG. 16, a second embodiment of the present invention is shown where the plate stack 80 defines a prefilming airblast nozzle. To this end, referring now also to FIGS. 17A–29B, a series of circular plates 130–142 are properly aligned and located in surface-to-surface adjacent relation with one another. Plates 130–142 are in most ways similar to plates 86–96 in FIGS. 5A–15B, in that they are preferably etched, and provide flow paths for the fluids through the nozzle tip.

Specifically, axial, generally circular passages as at 149 are provided through the plates 130–132 (FIGS. 17A–19B) of the stack generally along the central axis of the nozzle, which are then connected through lateral passages as at 150 in plate 132 (FIG. 19B), to second axial passages as at 151 in plates 133–135 (FIGS. 20A–22B), generally parallel/offset from the central axis. The second axial passages 151 feed a series of lateral passages as at 153 in plates 134 and 135 (FIGS. 21A–22B), which non-radially (tangentially) intersect a central cylindrical swirl chamber or passage as at 155 in plates 134–138 (FIGS. 21A–25B), located generally along the central axis of the nozzle, which causes the fluid to have a swirling component of motion. The fluid forms a thin sheet along the walls of the swirl passage, and releases from the downstream plate 138 (the prefilmer lip) as a hollow, cone-shaped film which breaks into a spray of relatively large droplets. The spray passes through radially-enlarged cylindrical passages as at 156 in plates 139–142 (FIGS. 26A–29B) and out of the nozzle.

The description above of the passages 149, 150, 151, 153, 155 and 156 in plates 130–142 defines the first flow path for the first fluid from extension 40 to the nozzle tip 42. As in the first embodiment, fluid, such as water, directed through this path in sufficient volumes and velocities, creates a relatively uniform dispersion of droplets exiting the nozzle, which have a relatively large size. Such a spray can be used for cleaning surfaces of components of the engine, and as such, when (only) a first appropriate fluid is directed through the nozzle along tube 68 to the nozzle tip 42, the nozzle can be used as a cleaning device for the internal components of the compressor of a gas turbine engine.

As with the first embodiment the nozzle can also be used as a cooling device. To this end, general axial passages as at 162 are provided in plates 130–141 (FIGS. 17A–28B), offset from the central axis of the nozzle. Lateral feed slots as at 164 are provided in plates 139–141 (FIGS. 26A–28B) to direct the flow inward toward the central axis of the nozzle, downstream from the swirl chamber and non-radially (tangentially) into passages 156.

The passages 162, 164 and 156 further define the second flow path through the nozzle for the second fluid from the extension 40 to the nozzle tip 42. When a second fluid, such as air, is directed through the passages in sufficient volumes and velocities, the air provides additional atomization of the spray cone emitting from the filming surface, and uniformly mixes the spray, to create a fine dispersion of droplets. The air also adds additional momentum and swirling components of motion to the spray. Such a spray can be useful for efficiently cooling an inlet air stream into the compressor, or other appropriate fluid stream in the engine, and as such, when first and second fluids are directed through the nozzle to the nozzle tip 42, the nozzle can be used as a cooling device for the compressor of a gas turbine engine.

The remainder of the structure of the spray nozzle is preferably the same as in the first embodiment, and will not be described further for the sake of brevity.

Again, plate fabrication methods and configurations can be provided other than as described above to achieve the same result.

Thus, as described above, the present invention thereby provides a novel and unique multi-function spray nozzle which can be used: i) as a cooling device to introduce a fluid into the engine for cooling purposes, and ii) as a cleaning device to introduce a fluid into the engine for cleaning purposes. The spray nozzle is relatively straightforward to manufacture and assemble; and is replicatable, so that the efficiency and operation of the nozzles can be known and controlled.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A multi-function spray nozzle for creating and distributing fluid sprays, comprising:
   a connector having a first port for receiving a first fluid, and a second port for receiving a second fluid;
   a nozzle tip for delivering the first and second fluids in a spray; and
   an extension assembly extending between and fluidly interconnecting the connector and nozzle tip, wherein a plurality of stacked plates are received within the nozzle tip and include flow passages which cooperate to direct the first and second fluids through the nozzle tip and deliver the first and second fluids in a spray, further including an inside extension subassembly including i) a fluid tube received within a central bore of the extension assembly, and ii) the nozzle tip, the fluid tube internally defining a first flow path and fluidly connected between the first port and the nozzle tip; and externally defining a second flow path from the second port and between the tube and an inner wall of the central bore of the extension assembly to the nozzle tip.

2. The multi-function spray nozzle as in claim 1, wherein the fluid tube is elongated.

3. The multi-function spray nozzle as in claim 1, wherein the plates include flow passages and a spray orifice defining a first flow path through the nozzle tip, and other flow passages which define a second flow path through the nozzle tip, the flow passages and spray orifice configured to define a simplex nozzle delivering a hollow, cone-shaped spray.

4. A multi-function spray nozzle for creating and distributing fluid sprays, comprising:
   a connector having a first port for receiving a first fluid, and a second port for receiving a second fluid;
   a nozzle tip for delivering the first and second fluids in a spray; and an extension assembly extending between and fluidly interconnecting the connector and nozzle tip, wherein a plurality of stacked plates are received within the nozzle tip and include flow passages which cooperate to direct the first and second fluids through the nozzle tip and deliver the first and second fluids in a spray, wherein the plates include flow passages and a prefilmer lip defining a first flow path through the nozzle tip, and other flow passages which define a second flow path through the nozzle tip, the flow passages and prefilmer lip configured to define a prefilmer nozzle delivering a hollow, cone-shaped spray.

5. The multi-function spray nozzle as in claim 1, wherein the nozzle tip includes a bowl-shaped cover receiving the plate stack, the cover including an annular upstream end connected to a downstream end of a body of the extension assembly, and an annular end wall defining a central circular opening.

6. A multi-function spray nozzle for creating and distributing fluid sprays, comprising:
   a connector having a first port for receiving a first fluid, and a second port for receiving a second fluid;
   a nozzle tip for delivering the first and second fluids in a spray; and an extension assembly extending between and fluidly interconnecting the connector and nozzle tip, wherein a plurality of stacked plates are received within the nozzle tip and include flow passages which cooperate to direct the first and second fluids through the nozzle tip and deliver the first and second fluids in a spray, wherein the plate stack includes a series of plates defining a first flow path through the nozzle tip, and including non-radial feed slots and a central, cylindrical swirl chamber, where a first set of non-radial feed slots intersect the swirl chamber and provide the first fluid in a swirling manner into the swirl chamber.

7. The multi-function spray nozzle as in claim 6, further including a plate defining a spray orifice along the central axis at a downstream end of the swirl chamber such that the first fluid exits the swirl chamber in a hollow, cone-shaped spray.

8. The multi-function spray nozzle as in claim 6, wherein the plates defining the central cylindrical swirl chamber include a prefilmer lip such that the first fluid exits the swirl chamber in a hollow, cone-shaped film and breaks into a spray.

9. The multi-function spray nozzle as in claim 6, wherein the plate stack includes a central passage downstream of the swirl chamber, and a series of plates defining a second flow path through the nozzle tip, and including a second set of non-radial feed slots which intersect the central passage downstream of the swirl chamber, and provide the second fluid in a swirling manner toward the central axis of the nozzle.

* * * * *